No. 870,152. PATENTED NOV. 5, 1907.
A. H. ALBERGER.
STUFFING BOX.
APPLICATION FILED MAY 14, 1906.
2 SHEETS—SHEET 1.
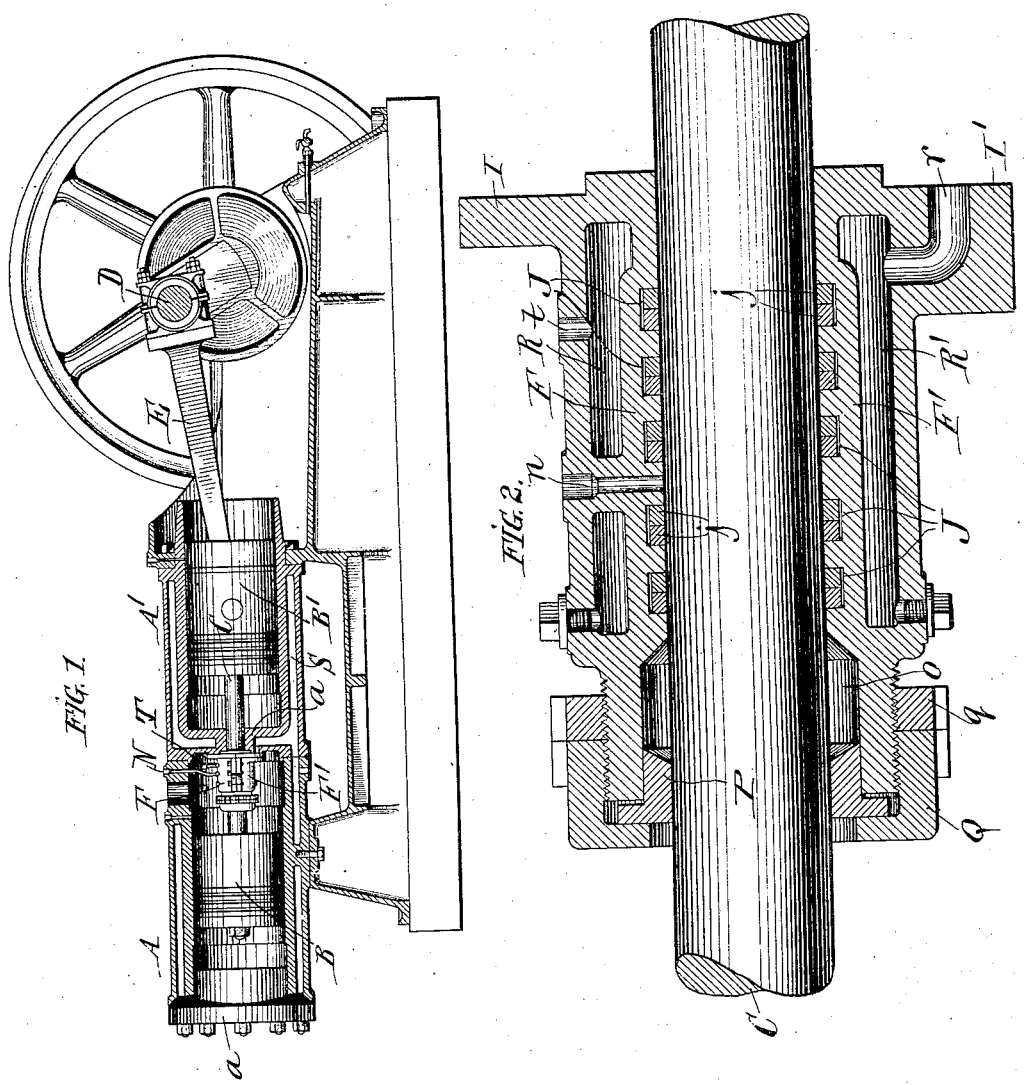
WITNESSES:
Alvan H. Alberger
INVENTOR
BY Geyer & Popp
ATTORNEYS.

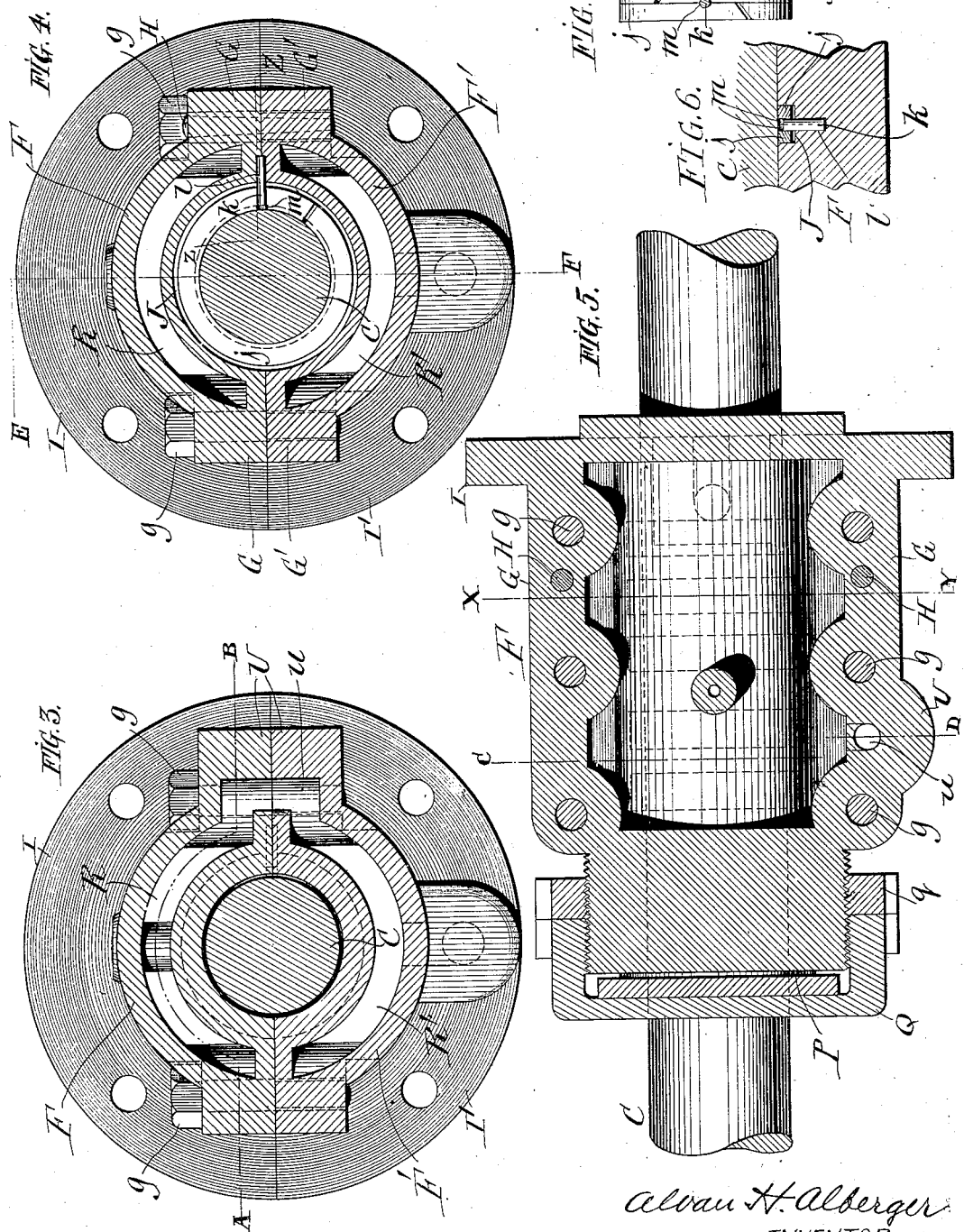

UNITED STATES PATENT OFFICE.

ALVAN H. ALBERGER, OF BUFFALO, NEW YORK.

STUFFING-BOX.

No. 870,152.

Specification of Letters Patent.

Patented Nov. 5, 1907.

Application filed May 14, 1906. Serial No. 316,856.

*To all whom it may concern:*

Be it known that I, ALVAN H. ALBERGER, a citizen of the United States, residing at Buffalo, in the county of Erie and State of New York, have invented a new and useful Improvement in Stuffing-Boxes, of which the following is a specification.

This invention relates to a stuffing box for piston rods or similar movable parts which must be packed against leakage. Rods of this character have heretofore been usually packed by means of stuffing boxes containing glands which compressed a soft packing around the rod. This kind of packing has been found unsuitable for piston rods which are exposed to a high temperature such as the piston rods of tandem gas engines. Furthermore a soft gland pressed packing wears unduly rapid when used for this purpose and requires frequent renewal in order to render the packing tight.

The object of this invention is the production of an improved stuffing box embodying split rings which effectually prevent leakage past a movable rod, which is simple and durable in construction and which can be readily applied to the rod and removed therefrom for inspection or repairs.

In the accompanying drawings consisting of two sheets:—Figure 1 is a vertical section of a tandem gas engine equipped between its cylinder with my improved stuffing box. Fig. 2 is a vertical longitudinal section of the stuffing box, on an enlarged scale, taken in line E—F, Fig. 4. Figs. 3 and 4 are vertical cross sections in lines C—D and X—Y, Fig. 2, respectively. Fig. 5 is a horizontal section in line A—B, Fig. 3. Fig. 6 is a fragmentary horizontal section in line Z—Z, in Fig. 4. Fig. 7 is a face view of a pair of packing rings.

Similar letters of reference indicate corresponding parts throughout the several views.

Although my improved stuffing box is applicable to movable rods in various kinds of machinery, the same is shown in the drawings applied to the piston rod of a tandem gas engine to illustrate one application of the invention.

A, A¹ represent the horizontal rear and front cylinders of the engine which are arranged axially in line and each of which has its rear or working end closed by a head $a$ while the opposite or front end is open to the atmosphere.

B, B¹ represent the pistons arranged in the cylinders, C the rod connecting the pistons, D the crank of the engine shaft and E the pitman connecting the front piston with the crank. The piston rod passes through the head of the front cylinder and leakage at this point around the piston rod is prevented by my improved stuffing box which is constructed as follows;

F, F¹ represent the upper and lower sections of the tubular body of the stuffing box which is arranged in rear of the front cylinder head and through which the piston rod passes. The division of the body is horizontally across its diameter and lengthwise thereof so that its two sections are of semicircular form. The opposing faces of these two sections are ground so that when the same are clamped together a tight-joint is formed between the same. The preferred means for connecting the body sections consists of screws $g$ which pass through companion longitudinal flanges G, G¹ on opposite edges of said body sections. Tapering dowel pins H seated in correspondingly shaped openings in the flanges G, G¹ serve to hold the body sections reliably in position relatively to each other.

At the front ends of the body sections the same are provided with annular flange sections I, I¹ which are secured to the adjacent side of the front cylinder head by screws or otherwise.

The bore of the stuffing box body is provided with one or more annular grooves J, a plurality of such grooves being shown in the construction represented in the drawings. Two spring packing rings $j, j$ each having a single split are arranged side by side in each of said grooves and encircle the piston rod. These rings are rectangular in cross section and the members of each pair are fitted closely in their respective groove but are capable of moving radially therein. In order to prevent leakage through the joints of the packing rings the members of each pair are arranged so that their joints are out of line and the same are retained in this relative position by means of a radial retaining pin $k$ seated at its outer end in a recess $l$ formed in the joint between the body sections while its inner end engages with recesses $m$ formed in the opposing sides of the respective pairs of packing rings, as shown in Figs. 4, 6 and 7. Oiling of these rings and the rod sliding through the same is preferably effected by means of a duct $n$ arranged in the upper part of the body and opening at its inner end into the bore of the same between two of its grooves J while its outer end is connected with an oil supply pipe or conduit N.

At its rear end the stuffing box body is provided with an annular pocket $o$ which receives a gland P between which and the bottom of said pocket a soft packing is arranged in the usual manner. This gland is pressed inwardly for tightening the packing around the piston rod by a clamping nut Q engaging its front end with an external screw thread on the stuffing box body while its rear end is provided with an internal shoulder which engages with the rear end of said gland. The clamping screw is held in its adjusted position by a jam nut $q$ arranged on the body.

In order to prevent the stuffing box from becoming unduly heated the same is constructed as follows: R, R¹ represent water jackets or chambers formed in the upper and lower sections of the stuffing box body around the bore thereof. The jacket R¹ of the lower section is provided at its front end with an inlet passage $r$ which, connects the water jacket S of the adjacent cylinder with the lower water jacket of the stuffing box for supplying the latter with cooling water. At the front end of the water jacket R in the upper section the same is provided with an outlet $t$ which connects with a waste pipe T for carrying the heated water away. The water is prevented from passing directly from the inlet $r$ to the outlet $t$ but is compelled to pass back and forth lengthwise of the water jackets R, $R^1$ for obtaining the full cooling effect thereof by stopping the water jackets in the upper and lower body sections short of the joint between the body sections and only connecting them on one side at the front ends thereof by a transverse passage $u$. The latter crosses the joint between the body sections and is formed in a lateral extension or enlargement V formed on the adjacent part of the body. The water entering through the lower port $r$ passes rearwardly through the lower jacket R, thence upwardly through the transverse passage $u$, thence forwardly through the upper jacket R, and thence out through the upper port $t$, whereby the heat in the stuffing box is carried off.

In assembling the parts of my improved stuffing box the packing rings are first expanded and placed upon the piston rod so that these rings when released exert an inward pressure against the periphery of the rod and prevent leakage between the rings and the rod. The sections of the body are now applied to the rod in such position that their internal grooves receive the packing rings after which the body sections are secured to each other and to the adjacent cylinder head. The soft packing is now placed in the pocket $o$ of the body sections, the gland P is engaged with the soft packing and the clamping nut Q is applied to the body and gland.

It has been found in practice that the spring ring packing forms an absolutely tight joint around the piston rod which effectually prevents leakage past the same. The gland packing can therefore be dispensed with but it is preferable to use the same in addition to the ring packing as it affords an additional security, so that if the rings should become broken or leak the gland packing can be utilized to prevent leakage until the ring packing is repaired. It is well known that a spring ring packing is the most durable and reliable but so far the same has only been used on the periphery of pistons and the like to form a tight joint between the same and the cylinders in which the pistons reciprocate. By dividing the stuffing box body it is possible to seat the packing rings in the grooves thereof so that they are held stationary and operated on the surface of the piston rod in the same manner in which similar rings on a reciprocating piston operate on the bore of a cylinder.

I claim as my invention:

1. A stuffing box comprising a tubular body having two semi-cylindrical sections which are adapted to receive a movable rod between them, each of said sections containing a semi-cylindrical water jacket or chamber which is independent of and unconnected with the water jacket or chamber of the other section except at one point at which said jackets or chambers communicate with each other by means of a passage, and one of said jackets or chambers having a water inlet and the other a water outlet, substantially as set forth.

2. A stuffing box comprising a tubular body having two semi-cylindrical sections which are adapted to receive a movable rod between them, each of said sections containing a semi-cylindrical water jacket or chamber which is independent of and unconnected with the water jacket or chamber of the other section except at corresponding ends thereof where the same are connected by a passage formed in a lateral enlargement of the body sections and extending across the joint between the sections, and said jackets or chambers being provided at their corresponding opposite ends with a water inlet and a water outlet, respectively, substantially as set forth.

Witness my hand this 15th day of April, 1906.

ALVAN H. ALBERGER.

Witnesses:
THEO. L. POPP,
RUTH TARBELL.